United States Patent [19]

Douty et al.

[11] 4,214,759
[45] Jul. 29, 1980

[54] SEAL FOR RAILROAD CAR HOPPER DOORS

[75] Inventors: Donald L. Douty, Franklin Township, Allegheny County; Robert J. Elgin, Penn Township, Westmoreland County, both of Pa.

[73] Assignee: United States Steel Corporation, Pittsburgh, Pa.

[21] Appl. No.: 32,053

[22] Filed: Apr. 23, 1979

[51] Int. Cl.² .............................................. F16J 15/10
[52] U.S. Cl. ........................................ 277/12; 277/56; 277/205; 277/209; 49/401; 49/483; 105/247; 105/282 A
[58] Field of Search ................ 49/475, 483, 485, 488, 49/490, 495, 401, 402; 105/247, 424, 282 A, 308 A; 277/12, 56, 57, 205, 207 R, 209, 210

[56] References Cited

U.S. PATENT DOCUMENTS

| | | | |
|---|---|---|---|
| 2,355,859 | 8/1944 | Hankins | 105/247 |
| 2,506,259 | 5/1950 | Wine | 105/247 |
| 2,766,022 | 10/1956 | Bender | 277/56 X |
| 4,077,389 | 5/1978 | Vogel | 277/DIG. 6 |
| 4,112,852 | 9/1978 | Koranda | 277/56 X |
| 4,130,966 | 12/1978 | Kujawa et al. | 49/401 X |

FOREIGN PATENT DOCUMENTS

| | | | |
|---|---|---|---|
| 681269 | 3/1964 | Canada | 105/282 A |
| 527710 | 6/1955 | Italy | 49/490 |
| 609951 | 10/1948 | United Kingdom | 49/485 |

*Primary Examiner*—Robert S. Ward, Jr.
*Attorney, Agent, or Firm*—Walter P. Wood

[57] ABSTRACT

A sealing means for doors of a railroad hopper car and an apparatus and method for forming a sealing strip. The sealing means comprises a preformed strip of RTV silicone rubber fixed to the door at its edges and receiving a flange on the door frame. Preferably the strip is formed by extruding RTV silicone rubber from a traversing head onto a screen.

5 Claims, 5 Drawing Figures

SEAL FOR RAILROAD CAR HOPPER DOORS

This invention relates to an improved means for sealing doors of a railroad hopper car against leakage of bulk material from the car, and to an improved method and apparatus for forming a sealing strip.

In transporting bulk material, such as ore or coal, in railroad hopper cars, there is a problem that a hopper door often is slightly misaligned with the frame on which it seats. Also material can adhere to the door or frame and prevent it from closing properly. The latter problem is aggravated by ice in winter. As a consequence material leaks around the door during transit onto the track bed beneath the car. Such leakage not only wastes material, but the leaked material is harmful to the drainage of the track bed and must be removed at substantial cost. The problem is particularly acute in transporting iron ore pellets, which are hard spheres up to about a half-inch in diameter. Once a pellet lodges between a hopper door and its frame, a steady stream of pellets tends to leak from the car. The most common form of hopper door has a pocket which extends around its edges and receives a flange on the door frame when the door is closed. It is known to spray a two-component plastic foam, commonly polyurethane, in the pocket to prevent leakage, but such foam must be replaced after each trip and becomes unduly costly.

An object of our invention is to provide in a hopper car an improved sealing means which effectively prevents material from leaking around the door and has a longer useful life than seals used heretofore.

A more specific object is to provide as a sealing means a preformed strip of room temperature vulcanized (RTV) silicone rubber inserted in the pocket around a hopper door or otherwise supported, and being of a cross-sectional configuration having a plurality of upstanding legs engageable with a flange on a door frame.

A further object is to provide an improved method and apparatus for forming a strip of RTV silicone rubber or like plastic suitable for use as a seal for hopper car doors, but not thus limited, in which the strip is extruded and becomes self-supporting almost immediately and tack-free after a minimum delay.

Figure 1:
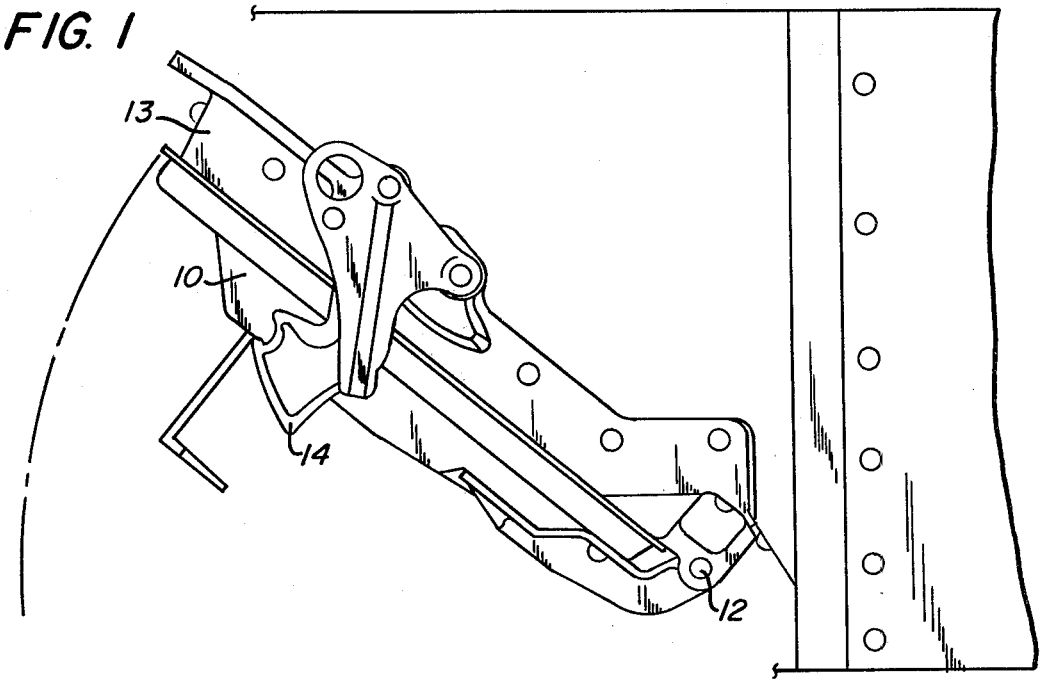
FIG. 1 is an end elevational view of a hopper door and frame and a portion of the surrounding structure with which our sealing means can be used.
Figure 3:
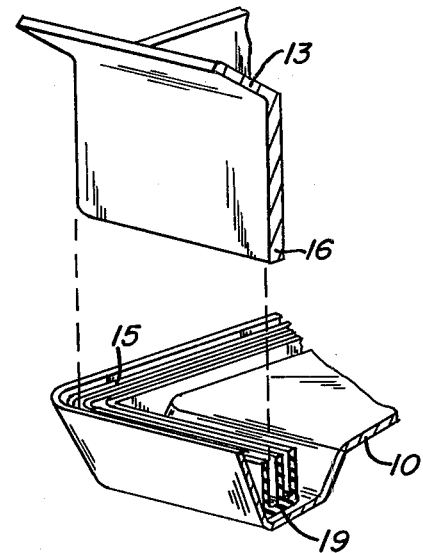
FIG. 3 is an exploded perspective view of a portion of a hopper door and frame equipped with a sealing strip in accordance with our invention.

FIG. 1 shows a portion of a railroad hopper car which has a hopper door 10 of the most common type. The door is hinged at 12 to a frame 13, and is held closed by a latch mechanism 14. As shown in FIG. 3, the door has an upwardly open pocket 15 along its edges, and the frame has a depending flange 16 which is received in the pocket when the door is closed. The particular door illustrated is only one example of a door to which the sealing means of our invention can be applied.

Figure 2:
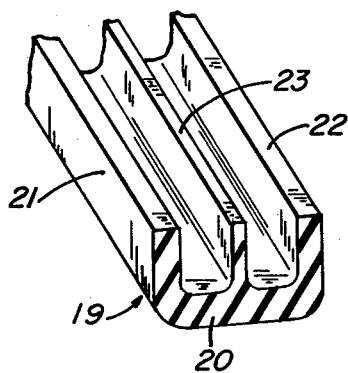
FIG. 2 is a perspective view on a larger scale, of a preformed sealing strip in accordance with our invention.

FIG. 2 shows our preferred form of preformed sealing strip 19, which is made up of RTV silicone rubber or equivalent. RTV silicone rubber has advantages that it is available as a one-component compound, it cures on exposure to air at room temperature to form a resilient sealing strip resistant to aging, weather and thermal cycling without hardening, and it can withstand temperatures up to about 250° F. encountered when frozen material in a car is thawed. Our preferred method and apparatus for forming the sealing strip is described hereinafter. The sealing strip 19 has a base 20, outside legs 21 and 22 and one or more intermediate legs 23 upstanding from the base.

When the hopper door 10 is of the type shown in FIG. 1, we insert the preformed strip 19 in the pocket 15 at the edge of the door, as shown in FIG. 3. Before inserting the strip, we clean the pocket surface with a wire brush to remove particulate material, and wipe the surface with a solvent to remove any oil or grease. This is the only preparation needed. We apply a layer of the same RTV silicone rubber to the back of the preformed strip and press it into place in the pocket. The bond becomes tacky and permits the door to be closed immediately. Full adhesion is achieved after about four hours. With doors of other types, we attach the strip on a surface which normally is contacted by a flange on the frame.

Figure 4:
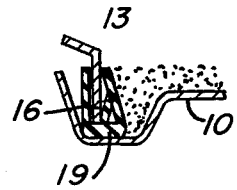
FIG. 4 is a vertical sectional view showing the door and sealing strip closed on the frame.

FIG. 4 shows the relation of the door 10 and frame 13 with the door closed and the sealing strip 19 in place. The flange 16 on the frame is received between the two outer legs 21 and 23 of the sealing strip. The flange bears against one or more intermediate legs 23 and deforms the intermediate leg to effect a tight seal while the door is closed. Since the RTV silicone rubber is resilient, intermediate legs come back to their original shape as soon as the door is opened.

Figure 5:
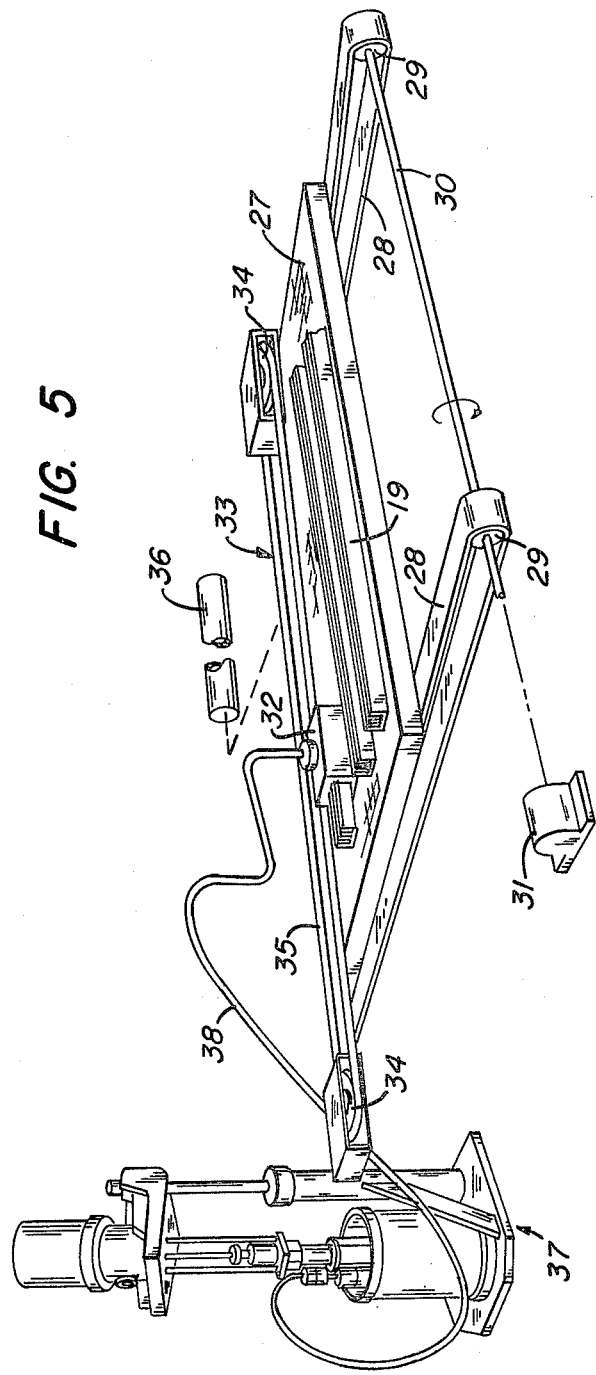
FIG. 5 is a diagrammatic perspective view of our preferred apparatus for forming the sealing strip.

FIG. 5 shows diagrammatically our preferred apparatus for forming the RTV silicone rubber sealing strip 19. The apparatus comprises a screen 27 preferably of fiberglass, a pair of belts 28 supporting the screen at opposite ends, pulleys 29 over which the belts travel, a common drive shaft 30 on which the pulleys are mounted, and an indexing drive 31 for the shaft. A laying head 32 preferably teflon, is supported above the screen 27 on a traversing mechanism 33. The traversing mechanism illustrated includes a pair of pulleys 34 mounted above opposite ends of screen, an endless cable 35 which extends around the pulleys and to which the laying head 32 is attached, and a double-acting fluid-pressure cylinder 36 operatively connected to the cable. A conventional pumping device 37 for supplying RTV silicone rubber is mounted alongside screen 27 and connected to the laying head 32 through a hose 38. Suitable pumping devices are available commercially, for example, from Graco, Inc., Minneapolis, Minnesota, or Aro Corporation, Bryan, Ohio.

According to the preferred method of the invention, the traversing mechanism 33 is operated to move the laying head 32 back and forth over the screen 27 in laying and return strokes, while the pumping device 37 supplies a steady stream of RTV silicone rubber to the laying head during its laying strokes. The rubber is extruded from the head and laid down on the screen 27 to form a strip 19 of the desired cross-sectional configuration. The indexing drive 31 is timed to operate at the ends of each laying stroke of the laying head to move the screen a predetermined distance to the right as viewed in FIG. 5.

The strip 19 becomes self-supporting almost immediately after it is laid down on the screen 27. The screen carrying the strip is removed from the belts and stored for a few hours, after which the strip is tack-free and ready to be installed on a hopper car door, as already described.

From the foregoing description, it is seen that our invention affords a simple effective means for sealing a railroad car hopper door against leakage. Our preformed sealing strip is easily made and installed, and it lasts through many trips of the car. It affords a substantial cost saving over one-trip plastic foam seals used heretofore.

We claim:

1. In a railroad hopper car which includes at least one hopper door and a door frame against which said door closes, said door and said frame providing a surface and a flange for engaging said surface when the door is closed, the combination therewith of an improved sealing means for said door, said sealing means comprising a preformed strip of RTV silicone rubber bonded to said surface to be abutted by said flange.

2. A sealing means as defined in claim 1 in which the bond is formed by a layer of RTV silicone rubber applied to the back of the preformed strip.

3. A sealing means as defined in claim 1 in which the strip has a base and a plurality of legs upstanding from said base, said flange being received between certain of said legs.

4. A sealing means as defined in claim 3 in which there are two outer legs and at least one intermediate leg, and said flange deforms said intermediate leg when the door is closed, but said intermediate leg comes back to its original shape when the door is open.

5. A sealing means as defined in claim 1 in which said door has a pocket extending around its edges, said surface lying within said pocket, and said flange being formed on said frame, said strip being inserted in said pocket.

* * * * *